3,705,811
PROCESS FOR AVOIDING STALING AND
IMPROVING THE QUALITY OF BREAD
Mikihiko Yoshida, Masakazu Mitsuhashi, and Mamoru Hidao, Okayama, Japan, assignors to Hayashibara Company, Okayama, Japan
Filed Feb. 3, 1970, Ser. No. 8,337
Claims priority, application Japan, Feb. 4, 1969, 44/8,559
Int. Cl. A21d 2/18
U.S. Cl. 99—91
2 Claims

ABSTRACT OF THE DISCLOSURE

A process which, in breadmaking, shortens the time required for proofing of the dough, appreciably increases the volume of the product, improves the inner texture and avoids staling of the bread, comprises mixing a small amount of low molecular amylose into the wheat flour.

Figure 1:
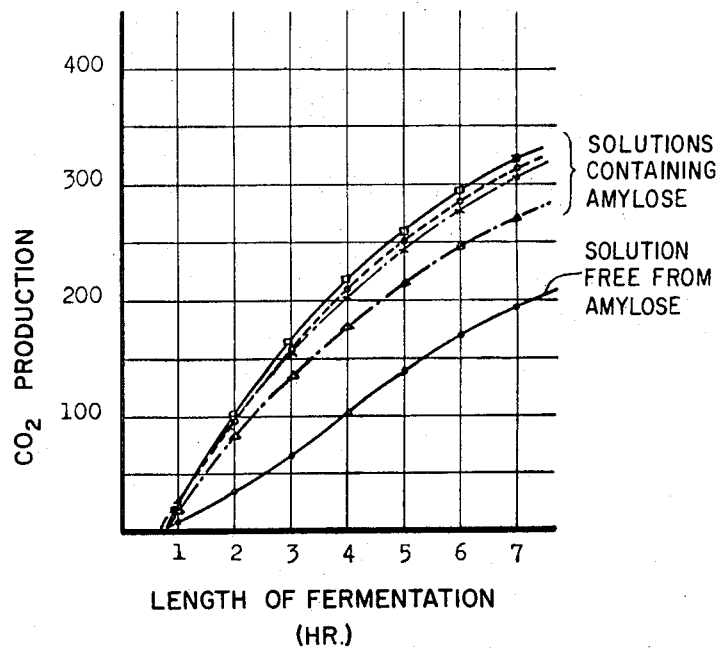

This invention concerns a process which, in breadmaking, shortens the time required for proofing of the dough, appreciably increases the volume of the product, improves the inner texture and avoids staling of the bread, by mixing a small amount of amylose into wheat flour.

Manufacture of breads has long been a subject of diversified researches, and various breadmaking techniques including the so-called sponge dough method and straight dough method, and recently the more improved ferment or continuous method have been proposed and used. However, they have problems as to the quality of breads that are produced, which are required to be even in structure and texture, well expanded, and have good flavor and color on baking. In addition, the employment of quantity production systems have given rise to an important problem of storability or anti-staling quality. Because bread is made essentially of wheat flour, or starch and protein (gluten), the conversion or transformation of gluten can have a direct bearing upon the flavor and texture of the product, while starch, the chief constituent, deteriorates with time and stales, thereby causing serious changes in the flavor, palatability and appearance. How to avoid the staling is thus a problem of significant importance for the baking industry.

With this in view, the present inventors conceived the idea of utilizing the amylose that had been previously disclosed in the copending specification of patent application No. 810,314 (USA), (Japanese patent application No. 43/21,365) or commercially available amyloses. The amylose may be obtained by the hydrolysis of starch with isoamylase pullulanase or the like. Because the intricate changes through which dough is expanded by the leavening action of yeast, while the high-molecular amylose, amylopectin and protein are being partly subjected to the action of amylases and proteases, are changes that take place during the process of bread-making or while the bread is in storage, the present inventors anticipated that straight-chain amylose that has affinity to those high-molecular substances but is only present in a fraction of one-hundredth in molecular weight could be dispersed among the protein or starch molecules in the form of a meat and would contribute to an improvement of bread texture or to prevention of staling. In the stage of prefermentation, the gluten of protein acquires viscosity and disperses but the starch, still at a temperature not high enough for gelatinization, remains in the powdery form. Therefore, it was expected that the addition of a small amount of water-soluble amylose composed essentially of short-chain molecules would promote uniform dispersion of protein and starch molecules, enhance their affinity, and help the dough expand on fermentation. It was surmised, moreover, that, when the thoroughly gelatinized starch in baked bread is about to retrograde to a dry, stale condition, the low-molecular amylose mixed in the bread would be dispersed among the molecules of the high-molecular amylopectin, thus hampering the retrogradation and allowing the bread to retain an adequate amount of moisture.

On the basis of these surmises, low-molecuar amyloses were mixed into wheat flour and then breads were made in the usual manner. The results were, as illustrated in the examples to be given later, a reduction of the proofing time to 25 minutes, or about one half the usual length of time required, no change in the baking time, and increases in the bread volume on baking by more than 10 percent with good inner structures. The degrees of retrogradation or staling with time were determined by means of a compressiometer, the products according to this invention giving better results than controls did. In other words, the process of the invention is effective in avoiding staling of breads, increasing the number of days for storage, and thereby permits mass production and storage of breads. The invention thus has a very significant value for commercial breadmaking.

As regards the rapid fermentation and short proofing time that characterize the present invention, the carbon dioxide productions on sucrose-containing culture media were compared. The results indicated that the addition of many different amyloses increased the usual gas production by nearly 50 percent.

It has become clear, therefore, that the addition of amylose is beneficial in accelerating the yeast fermentation and that amylose serves as an anti-staling agent for baked breads. The results of the experiments were as summarized below:

EXPERIMENTAL RESULTS (1) Fermentation test (1) Compositions of test solutions.—(A) Without the addition of phosphate:

Each kind of amylose (absent in the control) ---g--- 1
Water _____ml__ 30
Sucrose solution (20% w./v.) _____ml__ 10
Compressed yeast suspension (10% w./v.) ____ml__ 10

(B) With the addition of phosphates:

Each kind of amylose (absent in the control) ---g--- 1
Water _____ml__ 10
$KH_2PO_4$ solution (2.5% w./v.) _____ml__ 10
$(NH_4)_2HPO_4$ solution (2.5% w./v.) _____ml__ 10
Sucrose solution (20% w./v.) _____ml__ 10
Compressed yeast suspension (10% w./v.) ____ml__ 10

Figure 2:
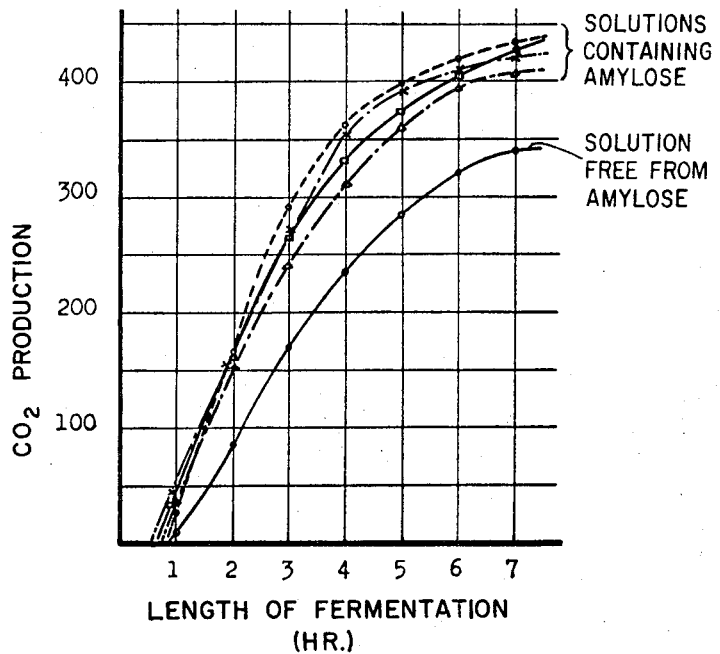

(2) Fermentation conditions.—Each test solution before the addition of the yeast suspension was preheated to 30° C. and, after the addition of the yeast suspension with stirring, it was allowed to stand and the amounts of carbon dioxide produced with time were determined. The pH values of the test solutions were:

In the solutions (A), invariably 5.50 initial and 2.75 final
In the solutions (B), invariably 6.80 initial and 2.75 final (3) In the accompanying drawing graphically comparing the amounts of carbon dioxide produced by different fermented liquors with the addition of various amyloses: FIG. 1 is a graph illustrating the results of fermentation tests with no phosphate; and FIG. 2 is a graph illustrating similar test results but with the addition of phosphates. The results were graphically shown in FIGS. 1 and 2. The comparison of the results with the amyloses obtained by decomposition of various starches with different enzymes and with a commercially available amylose, indicated that, regardless of the addition of phosphates, the amounts of $CO_2$ production in the solutions containing the amyloses were greater than in the solutions free from amylose by more than 50 percent, within the periods of 2 to 7 hours. This evidenced that amylose acts to promote the fermentation.

(2) Breadmaking test

Tests on the effect of addition of anti-staling agent (low molecular amylose) as determined by full flavor method.

The tests showed that the results on the 2nd day of the control without the addition of the anti-staling agent according to the invention were similar to the results attained by the compositions of the invention on the 3rd day, thus meaning that the usual storage life of bread can be extended by one day in accordance wtih the present invention.

| Example Number | 1 | 2 | 3 | 4 |
|---|---|---|---|---|
| Brand | Milling (without addition) | Sample 1% (20 g.) | Sample 2% (40 g.) | Sample 5% (100 g.). |
| Mixing ratio | Flour, 100%, Yeast, 2%, Sugar, 4%, Salt, 2%, Fat, 4%. | Inorganic food, 0.1%; Water absorption, 60%; Fermentation time, 2 h. | Sponge 26° C., L3"H1"; Dough 29° C., L3"H8". | |
| Water absorption | 60.0 percent | 60.0 percent | 60.0 percent | 60.0 percent. |
| Maturing period: | | | | |
| Floor time | 15 minutes | 15 minutes | 15 minutes | 15 minutes. |
| Bench time | do | do | do | Do. |
| Proofing time | 45 minutes | 23 minutes | 25 minutes | 25 minutes. |
| Baking time | 35 minutes | 35 minutes | 35 minutes | 35 minutes. |
| Dough weight | 520 grams | 520 grams | 520 grams | 520 grams. |
| Baked weight | 456 grams | 454 grams | 450 grams | 450 grams. |
| Baked volume | 1,750 cubic centimeters | 1,980 cubic centimeters | 1,970 cubic centimeters | 1,920 cubic centimeters |
| Rating: | | | | |
| Appearance— | | | | |
| Baked color, 15 | 10.5 | 11.0 | 11.0 | 11.0. |
| Volume, 15 | 10.5 | 12.8 | 12.7 | 12.0. |
| Structure— | | | | |
| | Lower round | Lower round | Longitud. | Longitud. |
| Shape, 20 | 15.5 | 15.5 | 16.5 | 16.0. |
| Hue, 20 | 15.0 | 15.0 | 15.0 | 15.5. |
| Crust, 10 | Many pinholes, 7.0 | Slightly less, 7.5 | Fair to good, 7.5 | Fair to good, 7.5. |
| Touch, 20 | 16.0 | Soft, poor return, 16.0 | Soft, poor return, 16.0 | Soft, poor return, 16.0. |
| Total mark | 74.5 | 77.8 | 78.7 | 77.7. |

Upon comparison with the control:

Doug condition: Tends to become firm and compact after the floor time. Proofing time shortened by about 20 min.

Product condition: Volume increased by more than 10%, with improved texture.

COMPRESSIOMETER READINGS SHOWING EFFECTS OF ADDITION OF ANTI-STALING AGENT

| Example number | 1 | 2 | 3 | 4 |
|---|---|---|---|---|
| 1st day, mm.: | | | | |
| 10 | 1.0 | 1.0 | 1.0 | 1.0 |
| 20 | 3.5 | 3.0 | 3.5 | 3.5 |
| 30 | 6.0 | 5.0 | 6.0 | 6.0 |
| 40 | 8.0 | 7.0 | 7.0 | 7.0 |
| 50 | 10.0 | 8.0 | 8.5 | 8.5 |
| 2nd day, mm.: | | | | |
| 10 | 2.0 | 2.0 | 1.5 | 1.5 |
| 20 | 6.0 | 5.0 | 5.0 | 6.0 |
| 30 | 9.5 | 8.0 | 8.0 | 9.0 |
| 40 | 13.0 | 10.0 | 10.0 | 11.5 |
| 50 | 16.5 | 12.5 | 12.5 | 13.0 |
| 3rd day, mm.: | | | | |
| 10 | 3.0 | 3.0 | 3.0 | 3.0 |
| 20 | 8.5 | 7.0 | 7.0 | 8.0 |
| 30 | 13.0 | 11.0 | 11.0 | 12.0 |
| 40 | 17.0 | 14.0 | 14.5 | 15.5 |
| 50 | 22.0 | 17.0 | 16.5 | 17.0 |

NOTES.—Ex. No. 1 . . . without addition; Ex. No. 2 . . . 1% amylose added; Ex. No. 3 . . . 2% amylose added; Ex. No. 4 . . . 5% amylose added.

What is claimed is:

1. In the process for the production of bread by preparing dough with wheat flour and baker's yeast, fermenting the dough and baking, the improvement comprising:
adding 1–5% of low molecular amylose per part by weight wheat flour to said dough during the preparation stage thereof to reduce the fermentation time and to avoid staling and retrogradation of the products.

2. A process in accordance with claim 1 wherein said low molecular amylose is obtained by the hydrolysis of starch with isoamylase or pullulanase.

References Cited

UNITED STATES PATENTS 2,850,389  9/1958  Ofelt et al. _____ 99—90 P X
3,271,164  9/1966  Andt _____ 99—90 P RAYMOND N. JONES, Primary Examiner J. R. HOFFMAN, Assistant Examiner U.S. Cl. X.R.

99—90 P, 150 R